United States Patent [19]
Walsh

[11] Patent Number: 5,963,622
[45] Date of Patent: Oct. 5, 1999

US005963622A

[54] MODE SIGNALLING METHOD AND APPARATUS

[75] Inventor: Dale M. Walsh, Golf, Ill.

[73] Assignee: 3Com Corporation, Santa Clara, Calif.

[21] Appl. No.: 08/902,403

[22] Filed: Jul. 29, 1997

[51] Int. Cl.$^6$ ................................................ H04M 11/00
[52] U.S. Cl. ........................ 379/93.33; 375/222; 358/434
[58] Field of Search .............................. 379/93.26–93.34, 379/93.01, 93.08, 100.14, 100.17; 358/434–440

[56] References Cited

U.S. PATENT DOCUMENTS

| | | | |
|---|---|---|---|
| 4,000,371 | 12/1976 | Ogawa | 379/93.28 |
| 5,490,209 | 2/1996 | Kennedy et al. | 379/93.33 |

*Primary Examiner*—Wing F. Chan
*Attorney, Agent, or Firm*—McDonnell, Boehnen, Hulbert & Berghoff

[57] ABSTRACT

A method for identifying that a data communications device is operable in a predetermined mode. The first step of the method provides for generating a frequency division modulation capabilities signal. The generated signal is limited to a predetermined frequency range. The method further provides for superimposing mode identification information upon the generated signal to form a modified signal. Like the generated signal, the modified signal falls within the predetermined range. The superimposed mode identification information may be applied by frequency modulating the generated signal.

23 Claims, 2 Drawing Sheets

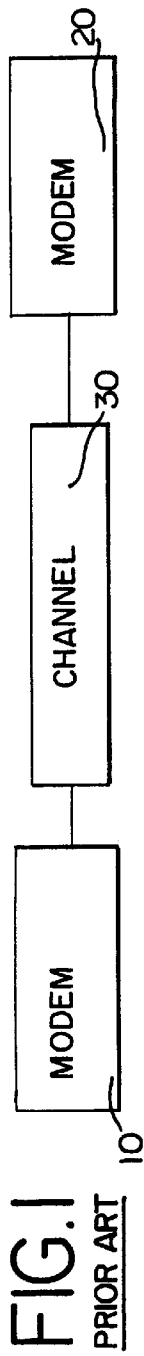
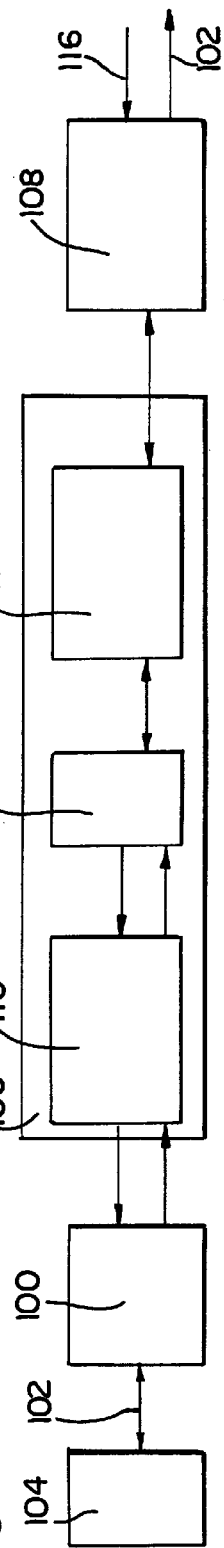
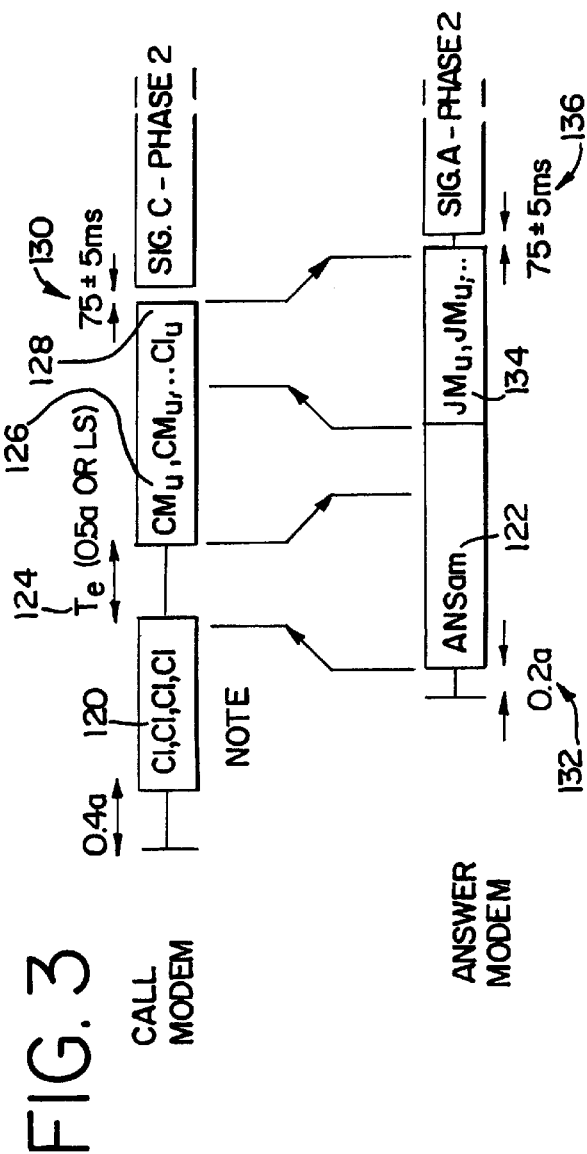

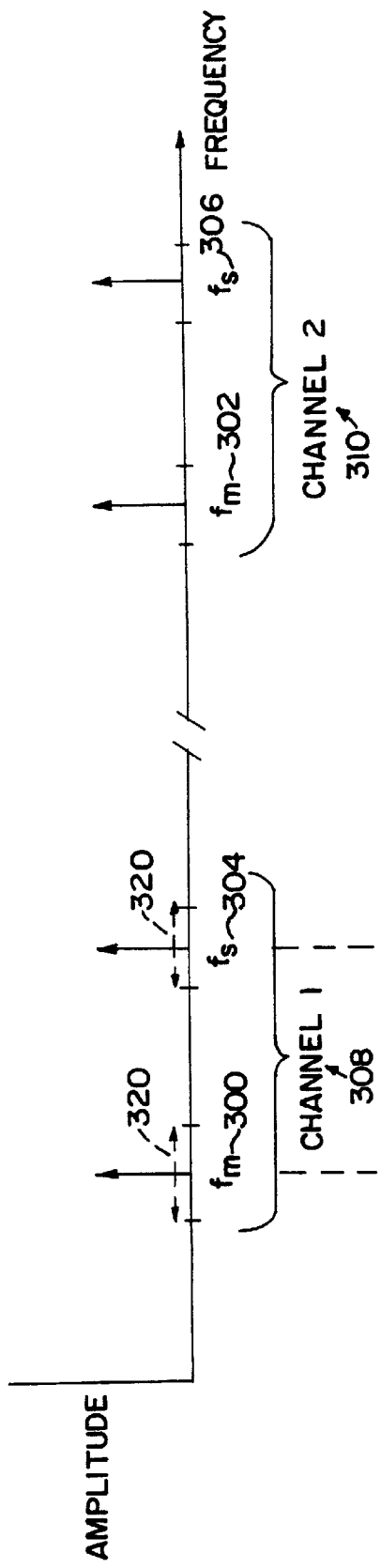
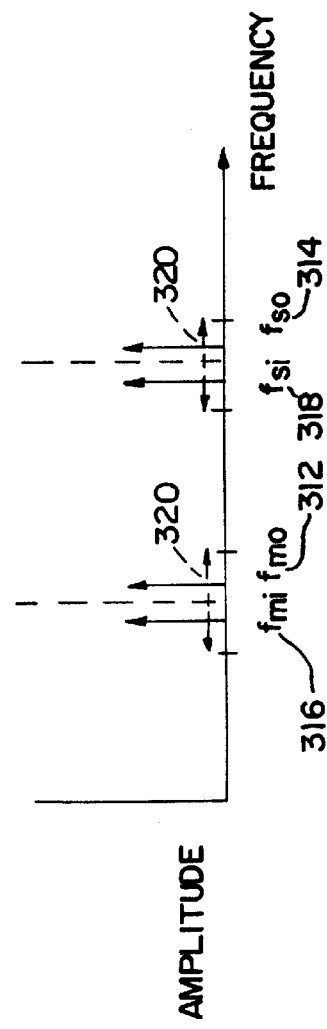

MODE SIGNALLING METHOD AND APPARATUS

BACKGROUND OF THE INVENTION

The present invention relates to data communication systems and, more particularly, to data communication systems that are operable in more than one mode. Data communication systems of this sort frequently utilize the public switched telephone network for at least a portion of the communication channel.

At the endpoints of a data communication system, one will find data communication equipment. The primary element of such equipment is typically some sort of modem. A communication channel connects the endpoints so that information may be communicated between the endpoints. The communication channel may be analog, digital or, commonly, a combination of digital and analog links. The modems typically modulate information for transmission over the communication channel and demodulate signals received from the communication channel to recover information.

A schematic representation of a data communication system is shown in FIG. 1. A first modem 10 is connected to a second modem 20 by a communication channel 30. The first modem 10 modulates input data 40 for transmission over the channel 30 to the second modem 20. The second modem 20 recovers the input data 40 by demodulating the signal received from the first modem 20. In like manner, input data 50 may be modulated by the second modem 20 and transmitted over the channel 30 to the first modem 10.

Implicit in the foregoing are: 1) there are different types of modems; and 2) different types of modems should be capable of communicating with each other. With respect to the different types of modems, modems may be classified, for example, by manufacturer, by structure (e.g. internal, external, PC card etc . . . ) or by the communication protocols that they support. For purposes of the present invention, the third criterion is the most pertinent.

A communication protocol, generally speaking, is a set of rules that defines how data communication devices interact. Numerous communication protocols have been developed to enable data communication between a wide range of data communication devices. For accurate information transfer between devices, the devices must operate under, or support, the same protocol.

It is becoming increasingly common for data communication devices to support several communication protocols. An appropriate communication protocol may be selected from among the available protocols depending upon the capabilities of the remote device and the communication channel. Unfortunately, one typically does not know, before a connection is made over the public switched telephone network, what type of modem will be encountered at the remote end of a switched connection. It is therefore desirable, at an early stage in the connection process, to identify the communication protocols that are supported. In addition, it is usually desirable to communicate information at the highest rate that the modems and the communication channel can reliably support.

The International Telecommunication Union-Telecommunications Standardization Bureau ("ITU-T") in Geneva, Switzerland, develops and publishes "Recommendations" that relate to communication protocols. The ITU-T Recommendations are non-binding international standards whose objective is to ensure compatibility of international telecommunications on a world-wide basis. The Recommendations referred to herein are publicly available from the ITU-T.

Protocols are known that identify the capabilities of a call modem that is connected to an answer modem by a communication channel. For example, Recommendation V.34, which is incorporated herein by reference and which is entitled *A Modem Operating at Data Signalling Rates of up to 28,800 bit/s for use on the General Switched Telephone Network and on Leased Point-to-Point 2-Wire Telephone-Type Circuits*, describes a network interaction protocol for identifying V.34 capability.

The V.34 protocol includes a preliminary data exchange according to ITU-T Recommendation V.8, *Procedures for Starting Sessions of Data Transmission over the General Switched Telephone Network*. Recommendation V.8 is incorporated herein by reference. During the preliminary data exchange, a call modem initially conditions its receiver to detect an answer tone, such as ANS or ANSam, from an answer modem. The call modem then transmits a call indicator or call tone, such as CI, CNG or CT, as defined by Recommendation V.8.

The ANS signal is a 2100 Hz tone, and is the typical tone produced by an answering modem that is not V.8 compatible. However, if the answering modem is V.8compatible, it provides the ANSam signal, which is defined as a 2100 Hz tone that has been amplitude modulated with a 15 Hz tone.

If the signal response ANSam is detected by the call modem, then the call modem transmits silence for a period of time, $T_e$ as specified by Recommendation V.8. If, on the other hand, the signal response ANS is detected, indicating that the answer modem is incapable of performing the CM/JM exchange, the call modem proceeds under a different protocol, for example as provided in Annex A of Recommendation V.32bis or Recommendation T.30.

Next, the call modem conditions its receiver to detect a joint menu signal, JM, and transmits a call menu signal, CM. The call menu signal, CM, includes the appropriate bits set in the modulation modes category, as provided in Table 4/V.8, to indicate that operation in accordance with Recommendation V.34 is desired. The CM sequence includes eight information bits (an octet) plus a start bit and a stop bit, for a total of ten bits per word.

When a minimum of two identical JM sequences have been received, the call modem completes the current CM octet and then sends a call menu terminator signal, CJ, to acknowledge JM and terminates the call menu signal. After sending CJ, the call modem transmits silence for 75±5 ms and proceeds with the remaining steps of ranging/probing, equalizer and echo-canceller training, and final training as described in Recommendation V.34.

During the Recommendation V.8 interchange described above, the CM and JM words are transmitted between modems using the signaling format specified in Recommendation V.21, which is entitled 300 *Bits Per Second Duplex Modem Standardized for Use in the General Switched Telephone Network*. Recommendation V.21, which is incorporated herein by reference, defines a type of Frequency Shift Keying (FSK) that is referred to herein as Frequency Division Modulation (FDM). The modulation format operates at 300 bits per second (bps), where a logic one bit (also referred to as a "mark") is transmitted from the call modem to the answer modem (channel no. 1) as a 980 Hz nominal tone, and a logic zero bit (also known as a "space") is transmitted from the call modem to the answer modem (channel no. 1) as a 1180 Hz nominal tone. Recommendation V.21 specifies that the transmitter frequencies are to be within ±6 Hz of their nominal values, and that the receiver must be able to correctly interpret the mark and space frequencies if they are within 12 Hz of their nominal values.

A disadvantage of the network interaction protocol described in Recommendation V.34 is that it does not identify the availability of non-standard or later devised data signalling modes or protocols. It is desirable to identify the availability of non-standard or later devised capabilities. In addition, it is desirable to do so without interfering with normal training and operation under Recommendation V.34.

Accordingly it would be desirable to have an improved mode signalling method and apparatus.

SUMMARY OF THE INVENTION

In accordance with a first aspect of the present invention, a method for identifying that a data communications device is operable in a predetermined mode, is provided. The first step of the method provides for generating a frequency division modulated signal. The generated signal is limited to a predetermined frequency range. The method further provides for superimposing mode identification information upon the generated signal to form a modified signal. Like the generated signal, the modified signal falls within the predetermined range.

It is an object of the present invention to provide a generalized escape sequence for changing operational modes in accordance with identified capabilities.

It is a further object of the present invention to provide a mode signalling method that does not interfere with standardized interaction protocols.

It is a still further object of the present invention to provide a mode signalling method that is capable of identifying operational capabilities without altering the procedures of Recommendations V.8 and V.34.

BRIEF DESCRIPTION OF THE DRAWINGS

FIG. 1 is a schematic representation of a known data communication system.

FIG. 2 is a schematic representation of a data communication system in accordance with a preferred embodiment of the present invention, which system is operable in a high speed signalling mode.

FIG. 3 is a schematic representation of a network interaction procedure with a $CM_u/JM_u$ exchange that may be performed over the communication system shown in FIG. 2.

FIGS. 4A and 4B are frequency plots illustrating signalling frequencies utilized during the $CM_u/JM_u$ exchange in accordance with a preferred embodiment of the present invention as compared to signalling frequencies utilized during a CM/JM exchange in accordance with Recommendation V.8.

DETAILED DESCRIPTION OF THE PRESENTLY PREFERRED EMBODIMENTS

The presently preferred embodiments of the invention will now be described with reference to FIGS. 2 through 4, wherein like elements are referred to by like numerals. FIG. 2 shows a data communication system. A first data communications device 100 receives information 102 from a data source 104. The information 102 may be in either analog or digital form, although digital information is preferred for high speed data transfer applications. For instances in which the data communications device 100 receives information 102 from the data source 104 that is in analog form, the data communications device 100 may include an analog-to-digital converter that converts analog information 102 into digital form. Thus, the input to the communications device 100 may be in either analog or digital form, and the output of the communications device 100 is digital.

The first data communications device 100 is connected by a communication channel 106 to a second data communications device 108. The communication channel 106 includes a digital telephone network ("DTN") link 110 that is coupled to an analog subscriber loop 112 by a local switch 114. The DTN 110 carries digital information in the form of pulse code modulation ("PCM") codewords, which are typically eight bits in length. The loop 112 carries an analog representation of digital information. The local switch 114 acts as an interface between the DTN 110 and the loop 112 by converting digital information supplied by the DTN 110 into analog form for transmission over the loop 112 and converting analog signals supplied by the loop 112 into digital form for transmission over the DTN 110. The analog-to-digital and digital-to-analog conversions performed by the local switch 114 are well known conversions, such as the $\mu$-law conversion that is utilized in North America and Japan or the European A-law conversion.

The preferred embodiments of the present invention relate to the ability of devices in the communication system, such as the data communications devices 100 and 108, to signal the availability of added capabilities. These added capabilities may include, for example, an alternative signalling mode, protocol compliance, a particular feature set or the like. The added capabilities may, for example, be capabilities that are proprietary to a particular manufacturer of data communications devices or, as a further example, the added capabilities may relate to non-standard data signalling modes or protocols, or to modes or protocols that are devised after a standard is put in place. Of course, it is envisioned that the added capabilities may be incorporated into later standards.

In accordance with a preferred added capability that may be supported by the data communication system shown in FIG. 2, the data communication device 100 maps received information 102 into PCM codewords that are selected from a subset of the complete set of PCM codewords that are utilized by the DTN 110. Preferably, the information 102 is digital data and the data communication device 100 encodes the data directly into PCM codewords. As used in the previous sentence, "directly" means that the PCM codewords represent the data itself, rather than representing a modulated analog waveform that corresponds to the data. This preferred added mapping capability may be referred to herein as high speed signalling mode, or simply, high speed mode.

In high speed signalling mode, the PCM codewords are transmitted to the DTN 110 in digital form at a rate that is compatible with a clock rate utilized by the DTN 110, such as 8000 codewords per second. It is important to note that, in this embodiment, the information is not converted to analog form between the first data communications device 100 and the DTN 110.

When the PCM codewords transmitted by the first data communications device 100 arrive at the local switch 114, the PCM codewords are converted into a corresponding sequence of analog voltages for transmission to the second data communications device 108 over the loop 112. The second data communications device 108 recovers the information 102, from the sequence of analog voltages that the device 108 receives from the loop 112, utilizing knowledge of: 1) the subset of codewords that are available to the first data communications device 100; and 2) the characteristics of the conversion between codewords and analog voltages that the local switch 114 performs.

Preferably, the subset of codewords that is utilized by the first data communications device 100 is determined in accordance with the characteristics of the communication channel 106. Typically, the digital-to-analog conversion characteristic of the local switch 114 includes output analog voltages that are unequally spaced, which is a result of the design of the communication channel for the transmission of voiceband signals. Depending upon the characteristics of the communication channel 106, the second data communication device 108 may be unable to distinguish between closely spaced output analog voltages. In order to avoid such ambiguities, the subset of codewords, therefore, preferably includes only codewords that are associated with output analog voltages that may be uniquely identified by the data communications device 108. A training sequence may be utilized to identify codewords that are appropriate for inclusion, or exclusion, from the subset.

By utilizing the high speed signalling mode described above, high speed transfer of the information 102 from the first data communications device 100 to the second data communications device 108 may be obtained. For example, if the communication channel 106 is such that the second data communications device 108 is capable of distinguishing all of the possible PCM codewords, and each codeword is utilized to carry eight bits of information 102, then data signalling rates of up to approximately 64 kilobits per second ("kbps") may be obtained. As the subset of codewords decreases in size from the set of all possible codewords, the data signalling rate decreases. Nonetheless, for a typical connection in the form shown in FIG. 2, data signalling rates in excess of 28,800 bits/s may be obtained in the high speed signalling mode.

For communication in the reverse direction, input information 116 is modulated by the second data communications device 108 and modulated analog signals are transmitted from the device 108 to the local switch 114 over the loop 112. At the local switch 114, the modulated analog signals are converted into PCM codewords for transmission over the DTN 110. The first data communications device 100 receives the PCM codewords from the DTN 110 and recovers the information 116 by demodulating the digital input from the DTN 110.

Preferably, communication in the reverse direction is performed in accordance with Recommendation V.34. Other protocols, such as Recommendation V.32bis may alternatively be used, although with a resulting decrease in data signalling rate.

The data communications devices 100 and 108 preferably include a digital signal processor and associated memory structures. The devices 100 and 108 may be modems. In addition, either or both of the data communications devices may be a personal computer, a server, a hub or the like, having modem capabilities, such as may be provided by a digital signal processor, or a microprocessor, and its associated memory structures. Moreover, an electronic device, such as a microprocessor, may perform the functions of both the data source 104 and the data communications device 100.

In a preferred embodiment, the data communications device 100 is a hub or server and the data communications device 108 is a modem. In accordance with a preferred signalling mode for such a communication system, the data communications device 100 is capable of transmitting data in high speed mode as well as other signalling modes, such as in accordance with Recommendation V.34. Likewise, the data communications device 108 is capable of receiving data in high speed mode as well as other signalling modes, such as in accordance with Recommendation V.34. In addition, the data communications device 100 is preferably capable of receiving data transmitted from the data communications device 108 in accordance with Recommendation V.34.

Referring now to FIG. 3, the preferred embodiment of a mode signalling method will be described. A call modem initially conditions its receiver to detect an answer tone, such as ANS or ANSam, transmitted from an answer modem. The call modem then transmits a call indicator or call tone 120, such as CI (shown), CNG or CT. If the signal response ANSam 122 is detected by the call modem, then the call modem transmits silence for a period of time, $T_e$, 124. If, on the other hand, the signal response ANS is detected, indicating that the answer modem is incapable of performing the CM/JM exchange and that high speed mode is unavailable, the call modem proceeds under a different protocol, for example as provided in Annex A of Recommendation V.32bis or Recommendation T.30.

Next, the call modem conditions its receiver to detect a joint menu signal, $JM_u$, and transmits a call menu signal, $CM_u$, 126. The call menu signal, $CM_u$, 126 includes the appropriate bits set in the modulation modes category to indicate that V.34 is desired. Table 4 of Recommendation V.8 shows the coding over two octets to indicate availability of General Switched Telephone Network V-series modulation modes, including the availability of V.34.

When a minimum of two identical JM or $JM_u$ sequences have been received, the call modem shall complete the current $CM_u$ octet and then send a call menu terminator signal, CJ or $CJ_u$ (shown), 128 to acknowledge JM or $JM_u$, respectively, and terminate the call menu signal 126. After sending CJ or $CJ_u$, the call modem transmits silence 130 for 75±5 ms and may then, for example, escape normal V.34 operation and proceed with the steps of ranging/probing, equalizer and echo-canceller training, and final training as appropriate for high speed signalling mode. The phrase "identical sequences" as used herein refers to sequences containing the same information.

The preferred embodiment of the mode signalling method as it pertains to the answer modem will now be described with reference to FIG. 3. Upon connection to the line, the answer modem initially remains silent for a period of time, $T_a$, 132. Preferably, $T_a$ is at least 200 ms. After waiting $T_a$, the answer modem transmits ANSam 122 in accordance with the procedure set forth in Recommendation V.8, § 7.2, including phase reversals. Next, the answer modem conditions its receiver to detect CM and $CM_u$. The answer modem may also be conditioned to detect call modem responses from other appropriate Recommendations.

At this point, if the answer modem detects a minimum of two identical CM sequences and does not detect $CM_u$, then the answer modem proceeds in accordance with Recommendation V.34, § 11.1.2.2. On the other hand, if the answer modem detects a minimum of two identical $CM_u$ sequences, then the answer modem transmits $JM_u$ 134 and conditions its receiver to detect CJ or $CJ_u$. Once three octets of CJ or $CJ_u$ are detected by the answer modem, the answer modem transmits silence 136 for 75±5 ms and may then, for example, escape normal V.34 operation and proceed with the steps of ranging/probing, equalizer and echo-canceller training, and final training as appropriate for the high speed signalling mode.

The mode signalling method described herein is preferably utilized to identify the availability of the high speed signalling mode of data transfer described above. However, the described method includes a generalized escape sequence that may be utilized to allow any two compatible communications devices to "escape" from one mode of operation into a different mode that both devices support.

In this description, the subscript "u" associated with the call menu (CM), joint menu (JM) and call menu terminator (CJ) signals represents signals that identify an added capability, for example the capability to operate in high speed mode. In the case wher the added capability is the capability to operate in high speed mode, $CM_u$ and $JM_u$ preferably conform to Recommendation V.8 but also signal a desire to escape normal V.34 operation and establish high speed signalling mode training and operation.

As shown in FIG. 3, data communications devices that are capable of high speed mode data transfer preferably transmit and recognize $CM_u$ and $JM_u$ instead of the CM and JM signals described in Recommendation V.8. It is also preferable that $CM_u$ and $JM_u$ be recognized as CM and JM, respectively, as described in Recommendation V.8, by data communications devices that are incapable of operating in high speed signalling mode.

In accordance with a signalling method that satisfies these preferences, $CM_u$ 126 and $JM_u$ 134 are transmitted in the modulation format specified in Recommendation V.21 and within the frequency tolerances specified in Recommendation V.21, but with a superimposed modulation that identifies high speed mode capability. In general, the signalling method of the preferred embodiment communicates one additional bit of information, i.e. capable or not capable of high speed signalling mode, through the superimposed modulation. Other than the superimposed modulation, $CM_u$ 126 and $JM_u$ 134 preferably include the same information content as the CM and JM signals described in Recommendation V.8. CM and JM may be referred to herein as frequency division modulation (FDM) capabilities signals.

The superimposed modulation, for example, may be a slight change in the Recommendation V.21 frequencies representing a mark and a space, such as ±1 Hz, following a predetermined pattern that may be detected by a receiver in a data communications device. Specifically, the call modem may transmit a first $CM_u$ sequence having Recommendation V.21 mark and space frequencies that are 1 Hz above nominal, e.g. a mark is transmitted as a 981 Hz signal and the space is transmitted as an 1181 Hz signal. A second $CM_u$ sequence, having the same information content as the first sequence, is then transmitted having Recommendation V.21 mark and space frequencies that are 1 Hz below nominal, e.g. a mark is transmitted as a 979 Hz signal and a space is transmitted as an 1179 Hz signal. As the pattern continues, mark and space frequencies in subsequent $CM_u$ sequences alternate between 1 Hz above nominal and 1 Hz below nominal.

In the same manner, the answer modem may confirm its high speed mode capability by transmitting a pattern of $JM_u$ sequences in which the mark and space frequencies in successive sequences alternate between 1 Hz above nominal and 1 Hz below nominal. Of course, other space and mark frequencies that fall within the ±6 Hz range of the nominal Recommendation V.21 frequencies may alternatively be used. For example, $CM_u$, $JM_u$ and $CJ_u$ may be transmitted in sequences in which the space and mark frequencies differ from the nominal frequencies by alternating between ±0.5 Hz from nominal for successive sequences.

It is important, for the embodiment described above, that the modified signal frequencies fall within the range prescribed by Recommendation V.21. In this manner, a V.34 modem (or V.21 receiver) that does not have the added capability (in the example above, high speed mode) will not detect the modified V.21 signalling. On the other hand, a device that has the added capability will include a V.21 receiver that is modified to detect the superimposed signalling.

FIG. 4a shows the mark frequencies $f_M$ 300, 302 and space frequencies $f_S$ 304, 306 of the V.21 FDM modulation scheme. Note that there are two independent channels, each having mark and space frequencies. Channel number 1, 308, is typically used for transmission of data by the calling modem, while channel number 2, 310, is typically used by the answer modem, in accordance with the V.21 specification.

FIG. 4b shows the set of presently preferred variations of the mark and space frequencies for channel number 1, 308, that may be utilized to convey additional information between data communications devices. The same variations may be used with the channel 2 frequencies. The frequencies $f_{M0}$, 312, and $f_{S0}$, 314, are 981 Hz and 1181 Hz, respectively, and the frequencies $f_{M1}$, 316, and $f_{S1}$, 318, are 979 Hz and 1179 Hz, respectively. As stated above, the frequency variation of the superimposed FDM signals may be larger, but should be such that they fall within the range, 320, specified by Recommendation V.21.

Thus, the preferred signalling method may communicate high speed mode capability, or some other added capability, by substituting a four frequency FDM signalling method for the two frequency FDM signalling method described in Recommendation V.21. In effect, the preferred embodiment creates an independent signalling channel that is superimposed upon the V.21 signalling format.

In alternative embodiments, the predetermined pattern of frequency shifts may be altered in any detectable manner and may occur at a higher baud rate. In addition, different frequencies may be utilized in the FDM signalling method as long as the frequencies remain within the transmitter tolerance of the nominal frequency ±6 Hz specified in Recommendation V.21. Furthermore, additional information may be transmitted using the superimposed modulation by defining additional signalling patterns or by utilizing more than four frequencies in the FDM signalling method. In a still further alternative, the superimposed modulation may be phase modulation of the mark and space frequencies specified in Recommendation V.21, rather than a multiple frequency FDM signalling method.

Referring back to the communication system shown in FIG. 2, if the data communications device 100 is a hub or server having modem capabilities, then the data communications device 108 will typically operate as the call modem in FIG. 3 and the device 100 will operate as the answer modem in FIG. 3. If the data communications devices 100 and 108 are capable of operation in the high speed signalling mode, the data communications devices 100 and 108 detect the superimposed modulation carried by the $CM_u$ 126 and $JM_u$ 134 sequences, respectively. In response to detecting the superimposed modulation, the data communications devices 100 and 108 are configured for high speed signalling mode.

The mode signalling methods described herein provide the advantages of uniquely identifying an added capability, for example high speed mode capability, without interfering with normal training and operation under a predetermined procedure, such as set forth in Recommendation V.34, for instances in which the answer modem is not capable of operation in acordance with the added capability (high speed mode in this case). In addition, the mode signalling methods identify added capabilities without using codes that are already established in ITU standards or reserved for future ITU use.

Although the foregoing discussion is addressed to the case wherein the added capability is a high speed signalling mode, the present invention is generally applicable to the identification of added capabilities. More specifically, a generalized escape sequence has been described herein. The preferred embodiments of the present invention relate to superimposing mode identification information upon a generated signal in a way that is: 1) transparent to devices that are incapable of operating in accordance with the identified mode; and 2) detectable by devices that are capable of operating in accordance with the identified mode. In this manner, added capabilities may be communicated and utilized where appropriate.

It is intended that the foregoing detailed description be regarded as illustrative rather than limiting and that it is understood that the following claims, including all equivalents, are intended to define the scope of the invention.

I claim:

1. A method for identifying that a data communications device is operable in a predetermined mode, comprising the steps of:

generating a frequency division modulated capabilities signal, said generated signal being limited to a predetermined frequency range; and superimposing mode identification information upon said generated signal to form a modified signal, wherein said modified signal falls within said predetermined range.

2. A method as claimed in claim 1, wherein said superimposed mode identification information comprises frequency modulation that is applied to said generated signal.

3. A method as claimed in claim 1, wherein said superimposed mode identification information comprises phase modulation that is applied to said generated signal.

4. A method as claimed in claim 1, wherein said superimposed mode identification information comprises a signalling pattern that indicates a capability for an alternate mode of operation.

5. A method as claimed in claim 1, wherein said modified signal is a call menu signal.

6. A method as claimed in claim 5, further comprising the step of transmitting said call menu signal to a remote data communications device.

7. A method as claimed in claim 6, further comprising the step of receiving said call menu signal at said remote data communications device.

8. A method as claimed in claim 7, wherein said remote data communications device detects said call menu signal as said generated signal.

9. A method as claimed in claim 7, wherein said remote data communications device detects said call menu signal as said modified signal.

10. A method as claimed in claim 9, further comprising the step of transmitting a joint menu signal from said remote data communications device, wherein said joint menu signal comprises said superimposed mode identification information.

11. A method as claimed in claim 1, wherein said frequency division modulation capabilities signal comprises signals at two frequencies, a first frequency representing a "one" and a second frequency representing a "zero."

12. A method as claimed in claim 11, wherein said first frequency is 980±6 Hz and said second frequency is 1180±6 Hz.

13. A method as claimed in claim 12, wherein said modified signal comprises a frequency division modulation signal having a third frequency that represents a "one" and a fourth frequency that represents a "zero," wherein said third frequency is greater than said first frequency, but falls within the range of 980±6 Hz, and said fourth frequency is greater than said second frequency, but falls within the range of 1180±6 Hz.

14. A method as claimed in claim 13, wherein said modified signal further comprises a fifth frequency and a sixth frequency, wherein said fifth frequency is less than said first frequency, but falls within the range of 980±6 Hz, and said sixth frequency is less than said second frequency, but falls within the range of 1180±6 Hz.

15. A method as claimed in claim 1, wherein said predetermined mode is a high speed signalling mode.

16. A method for identifying that a data communications device is operable in a high speed signalling mode, said method comprising the steps of:

providing a call modem that is coupled by an analog subscriber loop to a digital telephone network, said digital telephone network being operable to transmit a set of PCM codewords;

providing an answer modem having a digital connection to said digital telephone network, said answer modem being operable to map information into PCM codewords;

generating, at said call modem, a call menu signal, wherein said call menu signal comprises a frequency division modulated capabilities signal having a superimposed high speed signalling mode identification signal; and transmitting said call menu signal from said call modem to said answer modem.

17. A method as claimed in claim 16, further comprising the steps of:

detecting, at said answer modem, said call menu signal;

generating, at said answer modem, a joint menu signal, said joint menu signal representing that said answer modem is operable in said high speed signalling mode; and transmitting said joint menu signal from said answer modem to said call modem.

18. A method as claimed in claim 16, wherein said superimposed high speed mode identification signal comprises frequency modulation that is applied to said frequency division modulated capabilities signal.

19. A method as claimed in claim 18, wherein said call menu signal has at least two frequency components, said at least two frequency components falling within a range specified in Recommendation V.21.

20. A method as claimed in claim 16, wherein said answer modem receives said call menu signal from said call modem.

21. A method as claimed in claim 20, wherein said answer modem, after receiving said call menu signal, transmits information as a series of PCM codewords.

22. A method as claimed in claim 21, wherein said series of PCM codewords is transmitted at a rate of 8000 codewords per second.

23. A method as claimed in claim 20, wherein said series of PCM codewords directly represents encoded data.

* * * * *